United States Patent
Zhou et al.

(10) Patent No.: US 6,247,376 B1
(45) Date of Patent: Jun. 19, 2001

(54) ROLLABLE ENVELOPED WORM WITH TWO CURVE PROFILE

(75) Inventors: Peter Shixiang Zhou, Dayton; Harry Charles Buchanan, Jr., Spring Valley; Ralph John Unterborn, Dayton, all of OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/352,900

(22) Filed: Jul. 13, 1999

(51) Int. Cl.[7] .................................................... F16H 1/16
(52) U.S. Cl. .................... 74/425; 29/893.31; 29/893.32; 74/458
(58) Field of Search ........................... 29/893.31, 893.32; 72/88; 74/425, 458

(56) References Cited

U.S. PATENT DOCUMENTS

| 73,095 | * | 1/1868 | Harrigan et al. ........................ 74/458 |
| 2,279,414 | | 4/1942 | Scott . |
| 2,338,367 | | 1/1944 | Trbojevich . |
| 2,432,246 | | 12/1947 | Mackmann et al. . |
| 2,885,903 | | 5/1959 | Parz . |
| 2,935,886 | | 5/1960 | Wildhaber . |
| 2,935,887 | | 5/1960 | Wildhaber . |
| 2,935,888 | | 5/1960 | Wildhaber . |
| 2,952,977 | | 9/1960 | Kluge . |
| 3,728,907 | | 4/1973 | Stade . |
| 4,047,449 | * | 9/1977 | Popov ................................... 74/458 |
| 4,739,671 | * | 4/1988 | Nelson .................................. 74/425 |
| 5,012,691 | | 5/1991 | Bertot . |
| 5,259,262 | | 11/1993 | DuRocher et al. . |
| 5,295,730 | | 3/1994 | Rees . |
| 5,408,897 | * | 4/1995 | Klinar .................................. 74/425 |
| 5,605,071 | | 2/1997 | Buchanan, Jr. . |
| 5,829,305 | | 11/1998 | Ham et al. . |

* cited by examiner

Primary Examiner—Allan D. Herrmann
(74) Attorney, Agent, or Firm—J. Gordon Lewis

(57) ABSTRACT

A drive gear engages a driven gear with non-intersecting axes of rotation making an angle of approximately 90° with respect to one another. A shaft has a first portion with a predetermined diameter, and a second portion has an enveloped worm gear with at least one roll-formed helical tooth formed thereon with an outer diameter greater than the diameter of the first portion of the shaft. The extra envelopment achieves an overall smaller package size for competitive advantage. When the shaft is rolled, the outside teeth exceed the shaft diameter by a predetermined amount allowing more teeth to be in contact with the driven gear. An outer bearing can be placed at the end of the shaft to allow the teeth to be of a larger diameter than the shaft. The pitch of the teeth can vary. Preferably, the bearing groove is roll formed simultaneously with the teeth of the worm gear since the centroid of the enveloped teeth must be located with the gear center line.

18 Claims, 2 Drawing Sheets

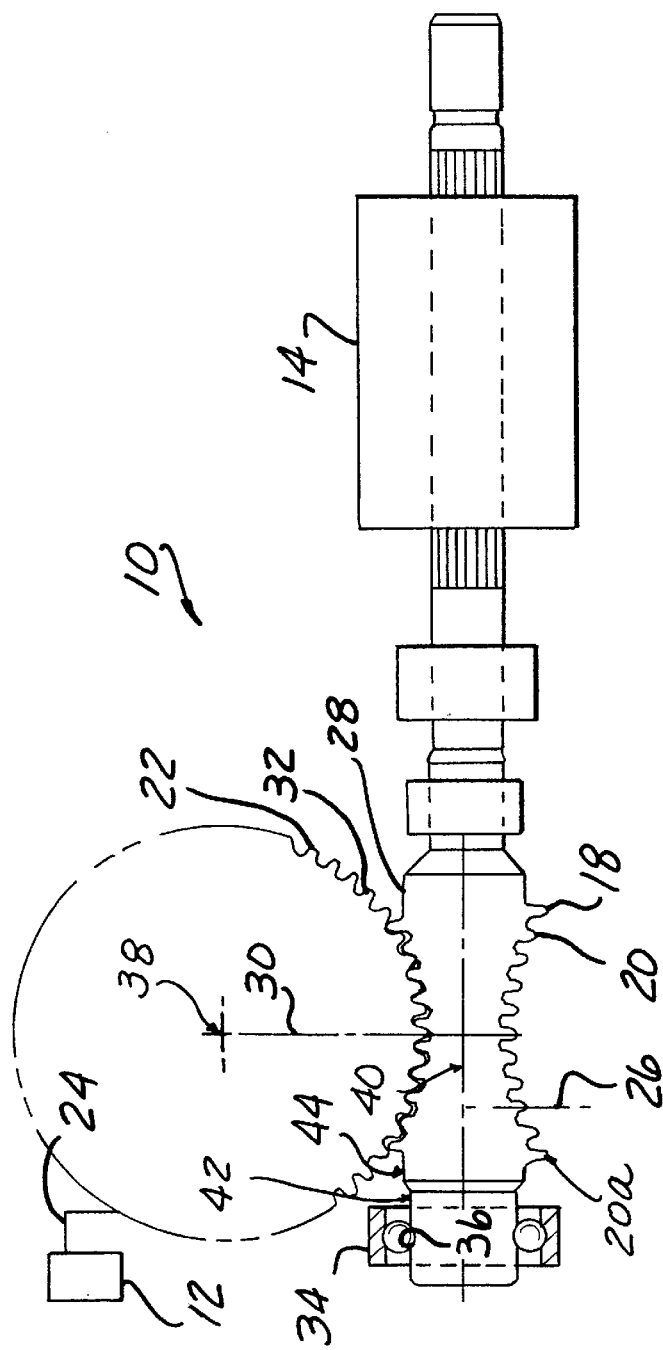
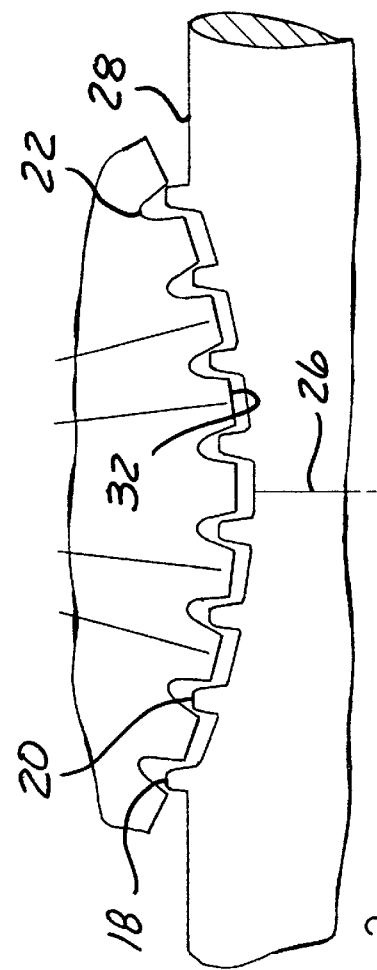
FIG-2
FIG-3

ROLLABLE ENVELOPED WORM WITH TWO CURVE PROFILE

FIELD OF THE INVENTION

The present invention relates to a rollable enveloped worm for engaging a gear with non-intersecting axes of rotation making an angle of approximately 90° with respect to one another for use in moving a closure member with respect to a portal through a barrier, such as a vehicle window drive system.

BACKGROUND OF THE INVENTION

In drive systems of the past, the outside diameter of a worm gear was constrained to be equal to the shaft or bearing diameter for ease of assembling through a bearing for a vehicle window drive system. The worm gear typically was rotatively driven by a drive motor and was used to drive a driven gear. The torque capacity of the worm gear was much less than that obtainable with an enveloped worm gear. The torque capacity of a worm gear is limited by having a primary or single contact tooth which contacts a mating tooth of the driven gear. Prior known enveloped worm gears have required that the teeth be specially machined and therefore are of limited application in vehicles requiring mass produced parts using conventional manufacturing techniques. Prior attempts have been made to use a conventional roll manufacturing technique to generate a multi-contact worm gear; however, such designs produced contact points where the gear teeth of the drive gear contacted mating teeth of driven gear situated on an arc which was concentric about the axis of the driven gear. This had the disadvantage of causing the multiple teeth to contact the driven teeth at a single contact location on the driven gear resulting in increased wear at that contact point, thereby reducing the useful life of the driven gear.

If a drive gear is used in a situation requiring driven movement in both a counter clockwise and clockwise direction both sides of each tooth are used to drive the load. Often times, the torque or load experience by the gear is not the same in both rotational directions. For example, when a passenger is seated on a power seat of a vehicle, a maximum load is experienced when the passenger raises the seat, while a minimum load is experienced when the passenger lowers the seat.

Prior known systems have provided a worm gear having teeth with sides which define pressure angles that are the same on both sides. When such a worm gear is used in a multi-torque environment, the gear experiences a maximum bending stress which is not balanced, and requires the motor to be of a capacity which can handle the maximum bending stress associated with the largest load.

SUMMARY OF THE INVENTION

The present invention provides a multi-tooth contact worm with an outside diameter which is not constrained to be equal to the shaft bearing diameter for ease of assembling through a bearing. The present invention starts with an eight millimeter, nine millimeter, or ten millimeter shaft, which when rolled provides outside teeth that exceed the shaft diameter by some amount allowing more teeth to be in contact with the drive gear. The extra envelopment of the present invention can be used to achieve an overall smaller package size for competitive advantage. The fact that the outer bearing is placed at the end of the shaft allows the teeth to be a larger diameter than the shaft bearing diameter. Preferably, the present invention simultaneously rolls the bearing groove with the worm, since the centroid of the enveloped teeth must be located with the gear centerline.

The present invention provides a drive system and method for manufacturing a multi-contact drive gear having improved torque capacity while enabling the gear to be manufactured using roll manufacturing techniques.

The present invention provides an increase in torque carrying capacity by preferably providing eight to twelve tooth contact between the drive gear and the driven gear. Maximizing the number of teeth in conjugate working contact between the worm gear and the worm wheel, and reducing the tooth height on both the worm gear and worm wheel provides the maximum bending strength for the individual teeth. Decreasing the worm gear tooth height allows a larger diameter core area for a given worm shaft size. This increases the capacity of the worm gear to resist bending forces. The present invention also provides a smaller diameter worm gear for a given speed reduction. More teeth in working contact allows the tangential force at the pitch diameter to be higher permitting a smaller pitch radius gear to handle a given torque. The present invention also provides a larger number of teeth in contact to increase the total gear mesh strength while allowing use of thinner teeth which are more resilient and can distribute the load while accepting greater errors in pitch match. More numerous, thinner teeth provide averaging of error and permits continued function even when one or two teeth are damaged thereby improving reliability of the worm gear system.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a detailed schematic view of a representative example showing a relationship between the intermeshing teeth of the drive gear and the driven gear; and FIG. 3 is a detailed schematic view showing a portion of the shaft including the bearing groove and enveloped worm gear teeth that are formed simultaneously by rolling.

DESCRIPTION OF THE PREFERRED EMBODIMENT

Figure 1:
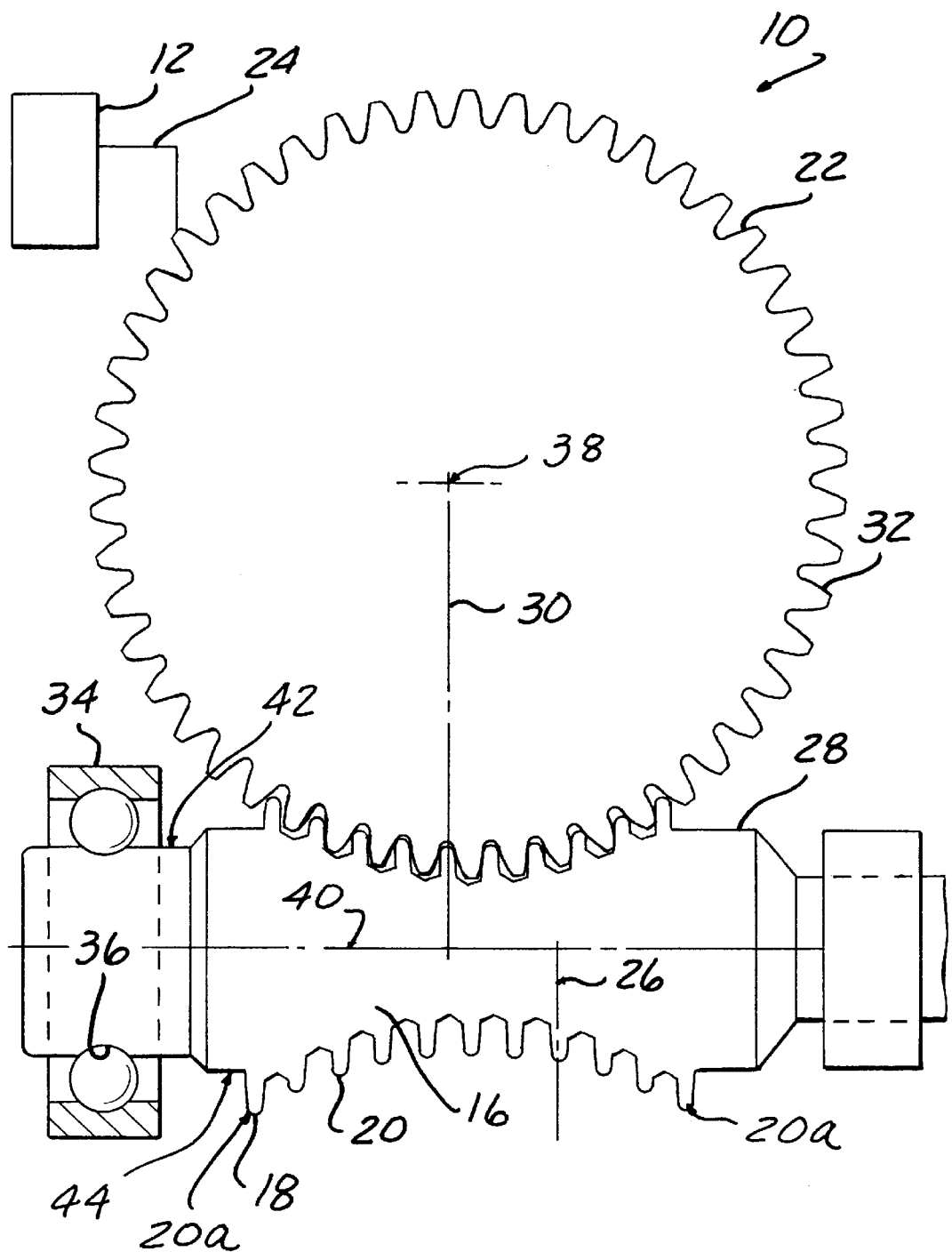
FIG. 1 is schematic view of a drive system according to the present invention.

A system 10 according to the present invention drives a component 12, such as a window (not shown) in a door (not shown) of a vehicle (not shown). The system 10 can include a drive motor 14 which is coupled to a drive gear 16. The drive gear 16 can include a worm gear having at least one helical thread defining a plurality of teeth 20 in cross-section. The drive motor 14 rotatably drives the drive gear or worm gear 16, preferably at approximately 3,000 revolutions per minute in response to actuation of a switch (not shown), such as a power window switch in a vehicle. The drive gear 16 is operably associated with and coupled to a driven gear 22. The driven gear 22 is coupled to the component 12 by any suitable linkage 24, such as a drive train of gears, lever arms or the like, as are conventionally known. The worm gear 16 includes a plurality of drive teeth 20, where each tooth 20 has an associated imaginary center line 26 and the center lines are substantially parallel to one another and substantially perpendicular to an axis of shaft 28. The center line 26 of each tooth 20 is also substantially parallel to a radial line 30 extending from the rotational axis 38 of the driven gear 22 that is also perpendicular to the axis 40 of the shaft 28. The shaft 28 has a first portion 42 with a predetermined diameter, and a second portion 44 has an enveloped worm gear 16 with at least one roll-formed helical tooth 20a formed thereon with an outer diameter greater than the diameter of the first portion 42 of the shaft 28. The present invention advantageously facilitates the manufacturing of drive gear 16 using conventional roll manufacturing techniques. By using conventional roll manufacturing techniques, the drive gear 16 can be produced on a mass production basis.

The plurality of teeth 20 of drive gear 16 engage mating teeth 32 on the driven gear 22 to rotatably drive the driven gear 22 in response to rotation of the shaft 28 by drive motor 14. The teeth 20 engage the mating teeth 32 at a plurality of contact points that lie within an arbitrary arrangement which is typically not concentric about the axis of the driven gear 22. The pitch distance between adjacent contact points may vary, while the angles formed between the contact points and the rotational axis of the driven gear 22 remain substantially equal. The pitches or distances between the imaginary center lines 26 of teeth 20 may vary continuously depending on the tooth position of the drive teeth 20. The point of contact between the teeth 20 and mating teeth 32 varies on each tooth face. The varying contact point facilitates distributing wear across the face of the plurality of teeth 32 of the driven gear 22. The present invention provides for increased torque capacity of drive gear 16 by providing three or more contact points, rather than a single or two tooth contact point for a conventional worm gear. It has been found that a drive gear 16 according to the present invention can achieve a torque capacity which is similar to that of an enveloped worm gear of the type requiring special machining which cannot be mass produced using conventional roll manufacturing techniques.

Preferably the teeth 20 define a profile which is curved to complement the shape of the driven gear 22, such that the driven gear 22 becomes at least partially enveloped. Alternatively, the plurality of teeth 20 could be manufactured such that the distance between the tips cooperate to define a profile which is stepped relative to the rotational axis of shaft 28. In addition, the drive gear 16 may be provided with teeth 20 which define a profile which is generally cylindrical or straight relative to the rotational axis of the shaft 28. Altering the arrangement and profile of teeth 20 can facilitate changing the contact points and can change the torque capacity of drive gear 16 by providing a greater number or lesser number of available driving teeth 20 for engaging the mating teeth 32 of the driven gear 22. Therefore, the present invention may incorporate variations in the distance between the outer tips of adjacent teeth 20 and the rotational axis of shaft 28. Preferably, the drive gear 16 incorporates varying tooth heights to define at least a partially enveloped worm gear. The present invention can be used in combination with a mating or driven gear 22 which is helical, spur or any suitable gear having involute teeth.

The extra envelopment provided by the worm gear according to the present invention achieves an overall smaller package size for competitive advantage. When the gear according to the present invention is roll formed, the outside teeth 20a exceed the shaft diameter by a predetermined amount allowing more teeth to be engagable in contact with the driven gear 22. An outer bearing 34 preferably is disposed at an end of the shaft allowing the teeth 20 to be formed of a larger diameter. The pitch of the teeth 20 can vary. Preferably, a bearing groove 36 is simultaneously roll formed with the worm gear 16, since the centroid of the enveloped teeth 20 must be located with the worm gear center line.

This application is related to U.S. application Ser. No. 08/997,125 filed Dec. 23, 1997 for a vehicle window drive system and method identified as, which is incorporated herein by reference in its entirety. Additional information regarding varying the pitch diameter of the teeth and the method of varying the pitch can be obtained from U.S. Pat. No. 5,829,305, which is incorporated herein by reference in its entirety.

A method for generating a gear having the features according to the present invention is described in detail in U.S. patent application Ser. No. 08/997,125 filed Dec. 23, 1997 which is incorporated herein in its entirety. Preferably, the worm gear 16 includes a curved shape, and the gear tooth thickness, worm tooth thickness, radial tooth position and axial tooth position are varied to achieve equal gear index angles. The drive torque of a roll manufactured drive gear according to the present invention is increased by generating a drive gear in accordance with this drive gear layout. A drive shaft 28 can be manufactured using conventional roll manufacturing techniques according to the present invention, since the teeth 20 are substantially parallel and the angular relationships substantially the same. The drive gear 16 and associated plurality of teeth 20 can be positioned in an operative relationship with a plurality of driven teeth 32 on the driven gear 22 which can be in the form of a spur gear, or a helical gear. The present invention provides for using roll manufacturing technology to generate a multi-tooth contact and a variable contact gear, such as a worm gear.

The drive gear 16 according to the present invention can be used in a vehicle environment where the drive motor 14 is energized by a controller in response to a switch. The drive motor 14 rotatably drives the drive gear 16 which, in turn, drives driven gear 22. The driven gear 22 drives a component 12 by any suitable linkage 24. This causes the component 12, to move in a desired direction. By way of example and not limitation, the component 12 can be a window in a vehicle and can be moved from an open position to a closed position or from a closed position to an open position. It should be recognized that other components could be driven by the roll-formed enveloped worm gear system according to the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A drive gear for engaging a driven gear with non-intersecting axes of rotation making an angle of approximately 90° with respect to one another comprising:

a shaft having a first portion with a predetermined diameter, and a second portion having a worm gear formed thereon with at least one roll-formed, enveloped, worm gear tooth having an outer diameter greater than the diameter of the first portion of the shaft, wherein said at least one worm gear tooth defines a plurality of cross-sectional gear teeth, each cross-sectional gear tooth having an imaginary center-line extending perpendicular to an axis of rotation of the shaft.

2. The drive gear of claim 1 wherein said worm gear includes a plurality of teeth engageable in contact simultaneously with a corresponding drive gear.

3. The drive gear of claim 1 further comprising:

an outer bearing placed adjacent an end of the first portion of the shaft allowing the at least one worm gear tooth to be of a larger diameter than the first portion of the shaft.

4. A drive gear for engaging a driven gear with non-intersecting axes of rotation making an angle of approximately 90° with respect to one another comprising:

a shaft having a first portion with a predetermined diameter, and a second portion having a worm gear formed thereon with at least one roll-formed, enveloped, worm gear tooth having an outer diameter greater than the diameter of the first portion of the shaft, the shaft having a roll-formed bearing groove on the first portion of the shaft.

5. The drive gear of claim 4 wherein said at least one worm gear tooth defines a plurality of cross-sectional gear teeth, each cross-sectional gear tooth having an imaginary center-line extending perpendicular to an axis of rotation of the shaft.

6. The drive gear of claim 4 wherein said worm gear includes a plurality of teeth engageable in contact simultaneously with a corresponding drive gear.

7. The drive gear of claim 4 further comprising:

an outer bearing placed adjacent an end of the first portion of the shaft allowing the at least one worm gear tooth to be of a larger diameter than the first portion of the shaft.

8. A drive gear comprising:

an elongate drive shaft having a first portion of a predetermined diameter and a second portion having a worm gear formed along a longitudinal length thereof;

at least one enveloped worm tooth roll-formed on the drive shaft along the second portion and having an outer tooth diameter greater than the diameter of the first portion of the shaft; and a roll-formed bearing groove formed on the first portion of the shaft.

9. The drive gear of claim 8 wherein said worm gear includes a plurality of teeth engageable in contract simultaneously with a corresponding drive gear.

10. A drive gear comprising:

an elongate drive shaft having a first portion of a predetermined diameter and a second portion having a worm gear formed along a longitudinal length thereof; and at least one enveloped worm tooth roll-formed on the drive shaft along the second portion and having an outer tooth diameter greater than the diameter of the first portion of the shaft, wherein said at least one worm gear tooth defines a plurality of cross-sectional gear teeth, each cross-sectional gear tooth having an imaginary center-line extending perpendicular to an axis of rotation of the shaft.

11. The drive gear of claim 10 wherein said worm gear includes a plurality of teeth engageable in contact simultaneously with a corresponding drive gear.

12. The drive gear of claim 10 further comprising the shaft having a roll-formed bearing groove on the first portion of the shaft.

13. A method for manufacturing a drive gear comprising the steps of:

roll-forming a shaft having a first portion of a predetermined diameter and a second portion to simultaneously form a bearing groove on the first portion and a worm gear on the second portion with at least one roll-formed, enveloped, worm gear tooth having a greater diameter than the predetermined diameter of the first portion of the shaft.

14. A drive gear manufactured by the method of claim 13 comprising:

the shaft having the first portion with the predetermined diameter, and the second portion having the worm gear formed thereon with at least one roll-formed, enveloped, worm gear tooth having the outer diameter greater than the diameter of the first portion of the shaft.

15. The drive gear of claim 14 wherein said at least one worm gear tooth defines a plurality of cross-sectional gear teeth, each cross-sectional gear tooth having an imaginary center-line extending perpendicular to an axis of rotation of the shaft.

16. The drive gear of claim 14 wherein said worm gear includes a plurality of teeth engageable in contact simultaneously with a corresponding drive gear.

17. The drive gear of claim 14 further comprising the shaft having a roll-formed bearing groove on the first portion of the shaft.

18. The drive gear of claim 14 further comprising:

an outer bearing placed adjacent an end of the first portion of the shaft allowing the at least one worm gear tooth to be of a larger diameter than the first portion of the shaft.

* * * * *